UNITED STATES PATENT OFFICE.

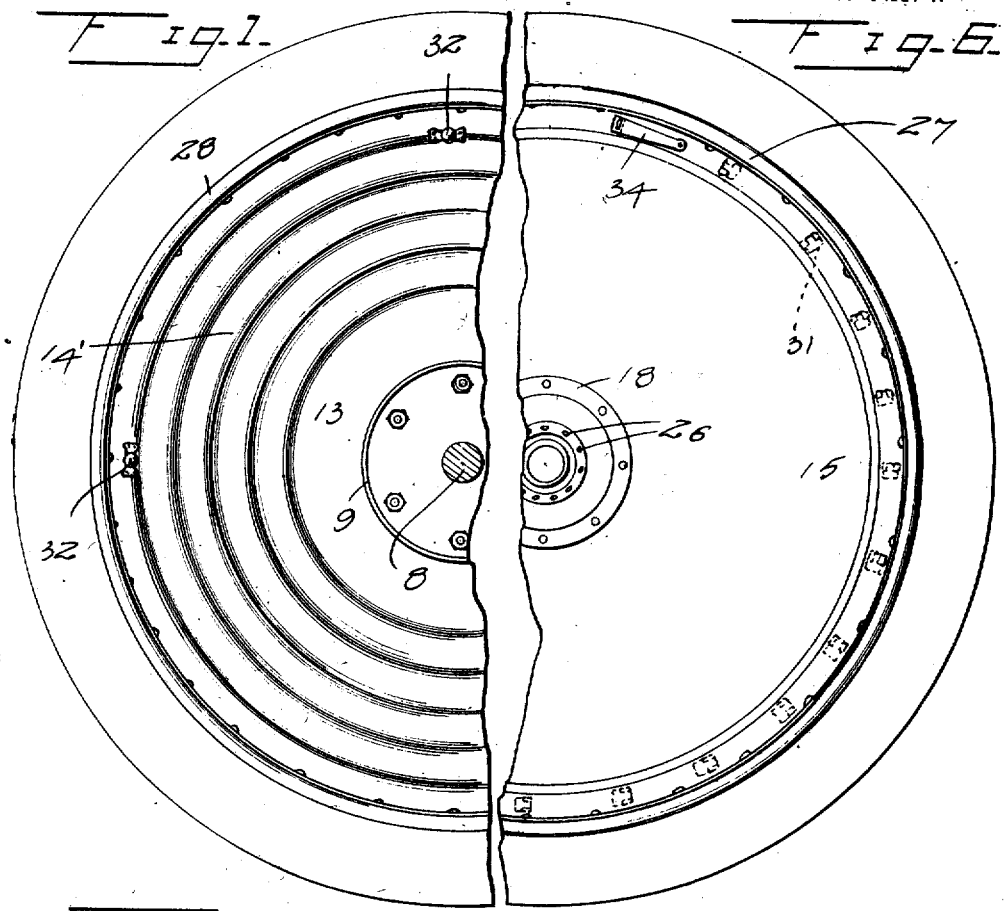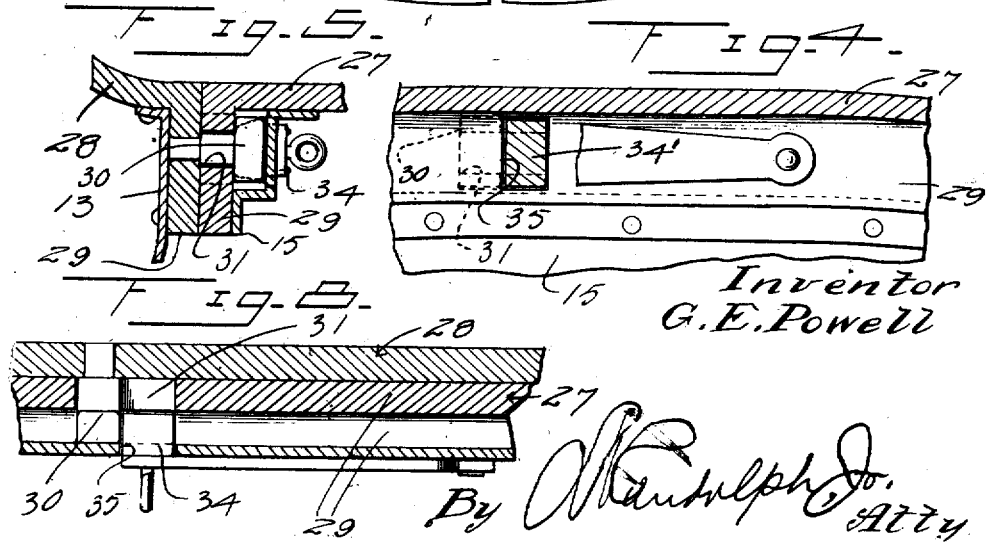

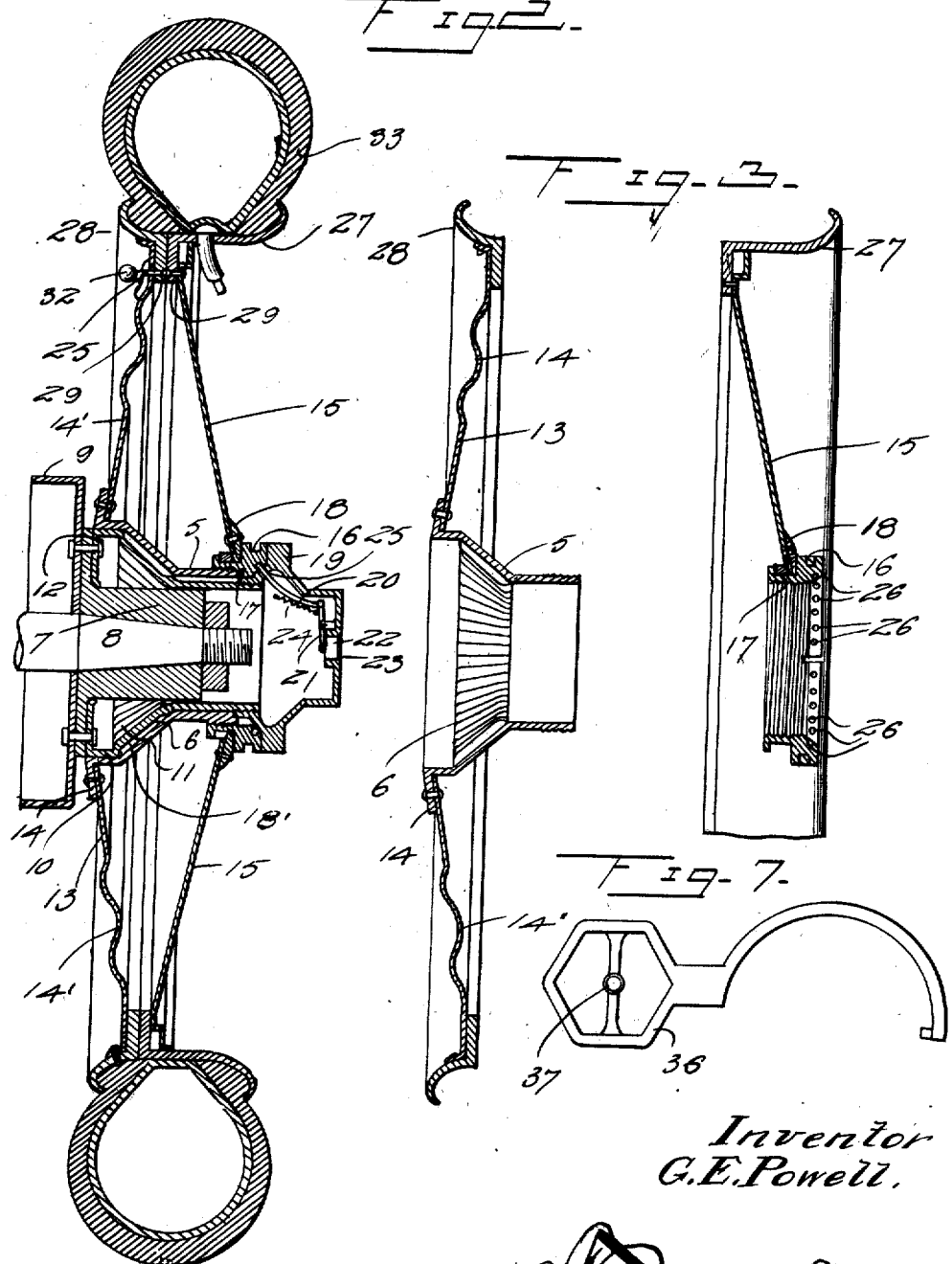

GEORGE E. POWELL, OF CHICAGO, ILLINOIS.

DEMOUNTABLE AUTOMOBILE-WHEEL.

1,401,815.  Specification of Letters Patent.  Patented Dec. 27, 1921.

Application filed December 17, 1919. Serial No. 345,473.

*To all whom it may concern:*

Be it known I, GEORGE E. POWELL, a citizen of the United States, residing at Chicago, in the county of Cook and State of Illinois, have invented certain new and useful Improvements in Demountable Automobile-Wheels; and I do hereby declare the following to be a full, clear, and exact description of the invention, such as will enable others skilled in the art to which it appertains to make and use the same.

The present invention relates to demountable automobile wheels, its principal object being to provide a wheel so constructed as to permit the rim thereof to be separated to facilitate the engagement of the usual pneumatic tire therewith and then positively locked to retain the tire in position.

A further object of the invention is to provide an automobile wheel which is durable and cannot become readily injured and which includes a pair of rim sections capable of being separated to permit the engagement of the pneumatic tire therewith, the rim sections being so assembled with the wheel proper as to render the operation of the mounting and dismounting of the tire easy to perform.

Still another object of the invention is to provide a wheel which may be readily disengaged from the axle and which at the same time will have a positive driving connection therewith.

Another general object of the invention is to provide a wheel which is simple in construction, consists of few parts, and which may be manufactured and sold at a minimum cost.

With the above and other objects and advantages in mind, the invention consists in the novel combination of elements, construction and arrangement, operation and specific features all of which will be hereinafter enlarged upon and defined in the appended claims.

On the drawings:

Figure 1 is a side elevation of a fragmentary part of a wheel constructed in accordance with my invention;

Fig. 2 is a vertical sectional view of the wheel in position on the axle;

Fig. 3 is a like view illustrating the wheel disengaged from the driving element and showing the rim sections separated for the engagement of the tire therewith;

Fig. 4 is a detail view partly in elevation and partly in section illustrating the manner of locking the rim sections together;

Fig. 5 is an enlarged fragmentary transverse sectional view taken through the rim sections and illustrating the locking means;

Fig. 6 is an elevation showing the face of the wheel reverse from that shown in Fig. 1;

Fig. 7 is a detail view of the wrench used in conjunction with the wheel; and

Fig. 8 is an enlarged fragmentary longitudinal sectional view taken through the rim sections and illustrating the locking means.

Referring to the drawing in detail wherein like characters of reference denote like parts throughout the several views, the numeral 5 designates the hub, the inner end of which is flared or enlarged and formed with interior circumferentially extending parallel teeth 6. A filler head at 7 receives an axle 8 and is rotatable therewith. Positioned upon the axle 8 and against the head 7 is the brake drum 9. Received upon the spindle 7 is a frusto-conical driving element 10 which is formed with parallel teeth 11 adapted to coincide with the teeth 6 upon the interior of the drum boxing or hub 5. The brake drum 9 and the frusto-conical element 10 are secured on the member 7 by fastenings 12 which extend through these parts.

The numeral 13 designates an annular plate having its inner edge attached to an annular flange 14 extending circumferentially of the enlarged end of the hub 5. This plate 13 is constructed from relatively stout material and is provided with circumferential corrugations 14'. The function of these corrugations is to prevent the plate from becoming distorted when the wheel is subjected to lateral strain. There is provided a second plate 15 for coöperation with the plate 13 and is positioned upon the opposite end of the hub 5 and engages with a collar 16 threaded upon this end of the hub. These plates are so shaped that they converge toward each other at their peripheral edges. A split ring 17 is engaged upon the split collar 16 and engages the inner face of the plate 15. A reinforcing element 18 is secured to the plate 15 at its inner edge and engaged between the ring 17 and the collar 16 and prevents this edge of the plate from becoming pinched between the collar and ring.

The frusto-conical driving element is received within the hub 5 and is provided with ribs or teeth 18' which intermesh with the teeth 6 of the member 5 and is retained in such position by a cap or nut 19 threaded upon the smaller end of the frusto-conical member 10. In order to prevent the cap or nut 19 from rotating in a counter-clockwise direction there is provided a locking pin 20 the inner end of which is pivoted to a link 21 pivotally mounted within the cap and which carries a head 22 disposed within a central opening 23 in the cap 19. A coil spring 24 has one end attached to the link 21 adjacent its point of pivotal connection with the pin 20 and has its opposite end fixed within the cap 19 and normally urges the pin 20 through an opening 25 in the cap into engagement with one of a plurality of openings 26 of the collar 16.

The rim sections are designated at 27 and 28 respectively and each includes a circumferential parallel flange 29 arranged in abutting relation and each being secured to the outer edge of one of the plates 13 and 15. Projecting from the inner face of the section 28 is a plurality of spaced studs 30 adapted for interlocking engagement with bayonet slots 31 formed in the flange of the section 27. Heads 32 are carried by the plate 13 and are adapted to be struck by a hammer or the like to cause this plate 13 to shift circumferentially with respect to the plate 15 in order to lock or unlock the rim sections.

In order to retain the rim sections in a locked position on the tire designated at 33 a resilient latch 34 is provided, one end of which is pivoted on the flange section 27 and carries a rectangular head 34' upon its free end to be received in an opening 35 in the outer edge of the plate 15 and in alinement with one of the openings 31 in the flange of the section 27. When the head is engaged in the opening 35 it contacts with the stud and engages the opening mentioned and retains the sections against shifting circumferentially.

I have provided a wrench for engaging the cap or nut 19 on the member 10 and to disengage the same therefrom, and which includes a head 36 from which extends a centrally disposed lug 37 adapted to enter the opening 23 in the cap 19 to move the head 22 inwardly whereby the pin 20 is retracted from the split collar 16 to allow the nut 19 to be assembled with or disassembled from the member 10.

In assembling the tire on the rim the collar 16 is loosened sufficiently to permit the plates 13 and 15 to be shifted circumferentially upon striking the head 32 with an implement which will dispose the studs at the widest part of the slots to permit the sections to be then sprung apart and the tire engaged therewith. After the tire has been placed between the sections, the section 28 is shifted as above stated in the opposite direction to dispose the studs at the narrow branch of the bayonet slots. The latch 34 is then engaged in the opening 35 and the collar 16 tightened against the plate 15. The tire is then inflated in the usual manner and ready for use.

The construction shown and described is the preferred embodiment of the invention but it will be understood that the same may be modified in many respects, and that such limits of modification are governed by what is claimed.

What is claimed as new is:—

1. A device of the class described having a hub section provided with a bearing portion, a second bearing portion, a conical portion connecting said portions, a wheel, a hub for the wheel having a conical portion and bearing portions, interengaging means on the conical portions, one of the bearing portions having external screw threads, a collar associated with the wheel engaging said screw threads, one of the bearing portions of the hub section projecting beyond the hub and having screw threads thereat, and a nut to abut the collar having a flange provided with screw threads to engage the latter screw threads.

2. A device of the class described having a hub section provided with a bearing portion, a second bearing portion, a conical portion connecting said portions, a wheel, a hub for the wheel having a conical portion and bearing portions, interengaging means on the conical portions, one of the bearing portions having external screw threads, a collar associated with the wheel engaging said screw threads, one of the bearing portions of the hub section projecting beyond the hub and having screw threads thereat, a nut to abut the collar having a flange provided with screw threads to engage the latter screw threads, and locking means mounted by the nut and extensible through said flange to engage the collar.

3. A device of the class described having a hub section provided with a bearing portion, a second bearing portion, a conical portion connecting said portions, a wheel, a hub for the wheel having a conical portion and bearing portions, interengaging means on the conical portions, one of the bearing portions having external screw threads, a collar associated with the wheel engaging said screw threads, one of the bearing portions of the hub section projecting beyond the hub and having screw threads thereat, a nut to abut the collar having a flange provided with screw threads to engage the latter screw threads, said flange being exteriorly channeled to directly receive the wheel section, filler means in the channel, and means on the latter section to enter the channel to lock the section thereto.

4. A device of the class described having a hub section provided with a bearing portion, a second bearing portion, a conical portion connecting said portions, a wheel, a hub for the wheel having a conical portion and bearing portions, interengaging means on the conical portions, one of the bearing portions having external screw threads, a collar for the wheel engaging said screw threads, one of the bearing portions of the hub section projecting beyond the hub and having screw threads thereat, a nut to abut the collar having a flange provided with screw threads to engage the latter screw threads, said flange being exteriorly channeled to directly receive the wheel section, filler means in the channel, means on the latter section to enter the channel to lock the section thereto, and locking means mounted by the nut and extensible through said flange to engage the collar.

5. A wheel having relatively axially movable sections, pins extending from one of the sections, the other section having bayonet slots to receive the pins, a retaining member for said pins, said member having a slot, a block movable in said slot to abut one of the pins to prevent accidental detachment of the sections, and means to mount the block from said member.

6. A wheel having relatively axially movable sections, a pin extending from one of the sections, the other section having a slot to engage the pin, retaining means for said pin to prevent lateral displacement thereof, and a block movable to abut said pin to prevent accidental detachment of the sections through axial movement.

In testimony whereof I affix my signature in presence of two witnesses.

GEORGE E. POWELL.

Witnesses:
JOE GOLDBERG,
FRED REINFELDT.